(12) United States Patent
Yu et al.

(10) Patent No.: US 9,078,149 B2
(45) Date of Patent: Jul. 7, 2015

(54) METHOD AND APPARATUS FOR IMPROVING CALL QUALITY FOR USER

(71) Applicant: Huawei Technologies Co., Ltd., Shenzhen, Guangdong (CN)

(72) Inventors: Shuojun Yu, Shenzhen (CN); Nian Peng, Shanghai (CN); Gengshi Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/108,188

(22) Filed: Dec. 16, 2013

(65) Prior Publication Data

US 2014/0106741 A1    Apr. 17, 2014

Related U.S. Application Data

(63) Continuation of application No. PCT/CN2011/075772, filed on Jun. 15, 2011.

(51) Int. Cl.
*H04B 1/00* (2006.01)
*H04W 24/02* (2009.01)
*H04B 1/10* (2006.01)
*H04B 15/00* (2006.01)

(52) U.S. Cl.
CPC ............. *H04W 24/02* (2013.01); *H04B 1/1036* (2013.01)

(58) Field of Classification Search
CPC ........................................... H04B 1/00
USPC ........................................ 455/63.1
See application file for complete search history.

(56) References Cited

U.S. PATENT DOCUMENTS

| 7,403,576 B2 | 7/2008 | Lakkis |
| 2007/0161361 A1* | 7/2007 | Vaisanen et al. .............. 455/302 |
| 2011/0085629 A1 | 4/2011 | Lindoff et al. |

FOREIGN PATENT DOCUMENTS

| CN | 101120517 A | 2/2008 |
| CN | 101127532 A | 2/2008 |
| CN | 102007702 A | 4/2011 |
| EP | 1786111 A1 | 5/2007 |
| WO | WO 2004114566 A1 | 12/2004 |

OTHER PUBLICATIONS

"3GPP TS 25.10—3$^{rd}$ Generation Partnership Project; Technical Specification Group Radio Access Network; User Equipment (UE) radio transmission and reception (FDD) (Release 8)," Version 8.9.0, 3$^{rd}$ Generation Partnership Project, Valbonne, France (Dec. 2009).

* cited by examiner

*Primary Examiner* — Huy C Ho
(74) *Attorney, Agent, or Firm* — Leydig, Voit & Mayer, Ltd.

(57) ABSTRACT

Embodiments of the present invention disclose a method and an apparatus for improving call quality for a user, which relate to the field of communication technologies and are invented for improving call quality for a user while improving frequency spectrum utilization. The method for improving call quality for a user includes: obtaining an interference suppression parameter and frequency band interference information of a target carrier; determining an interference suppression coefficient according to the interference suppression parameter and the frequency band interference information; and suppressing interference on the target carrier by using an interference suppression apparatus having the interference suppression coefficient.

29 Claims, 7 Drawing Sheets

METHOD AND APPARATUS FOR IMPROVING CALL QUALITY FOR USER

CROSS-REFERENCE TO RELATED APPLICATIONS

This application is a continuation of International Patent Application No. PCT/CN2011/075772, filed on Jun. 15, 2011, which is hereby incorporated by reference in its entirety.

TECHNICAL FIELD

The present invention relates to the field of communication technologies, and in particular, to a method and an apparatus for improving call quality for a user.

BACKGROUND

Frequency spectrum resources are resources of extreme importance in radio communication, and are a factor that affects the cost of an operator. Therefore, all operators want to improve frequency spectrum utilization as much as possible on the basis that user experience is almost not affected.

For example, for a UMTS (Universal Mobile Telecommunications System, Universal Mobile Telecommunications System) system or a DC-HSDPA (Dual-Cell High Speed Downlink Packet Access, Dual-Cell High Speed Downlink Packet Access) system, frequency spectrum utilization may be improved by reducing the spacing between carriers. However, during the implementation of the present invention, the inventors find that because the spacing between carriers is narrowed, interference between the carriers is increased, and call quality for users is deteriorated, resulting in poor user experience.

SUMMARY

Embodiments of the present invention provide a method and an apparatus for improving call quality for a user, so as to improve call quality for a user while improving frequency spectrum utilization.

The embodiments of the present invention adopt the following technical solutions.

A method for improving call quality for a user includes:

obtaining an interference suppression parameter and frequency band interference information of a target carrier;

determining an interference suppression coefficient according to the interference suppression parameter and the frequency band interference information; and suppressing interference on the target carrier by using an interference suppression apparatus having the interference suppression coefficient.

An apparatus for improving call quality for a user includes:

an obtaining unit, configured to obtain an interference suppression parameter and frequency band interference information of a target carrier;

a determining unit, configured to determine an interference suppression coefficient according to the interference suppression parameter and the frequency band interference information; and a processing unit, configured to suppress interference on the target carrier by using the interference suppression coefficient.

In the method and the apparatus for improving call quality for a user according to the embodiments of the present invention, interference of other carriers is suppressed by using the interference suppression coefficient obtained according to the interference suppression parameter and the frequency band interference information of the target carrier, which solves the problem of increased interference between carriers under the circumstances where the bandwidths of carriers are non-standard, thereby ensuring that the call quality for a user is improved while improving the frequency spectrum utilization.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from the accompanying drawing without creative efforts.

DESCRIPTION OF EMBODIMENTS

The technical solutions in the embodiments of the present invention are hereinafter described clearly with reference to the accompanying drawings in the embodiments of the present invention. Apparently, the described embodiments are only a part rather than all of the embodiments of the present invention. Based on the embodiments of the present invention, all other embodiments obtained by persons of ordinary skill in the art without creative efforts shall fall within the protection scope of the present invention.

Figure 1:
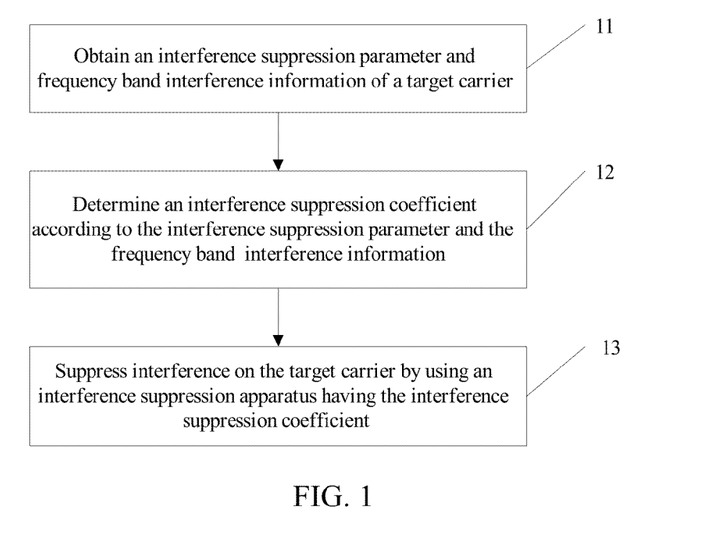
FIG. 1 is a flowchart of a method for improving call quality for a user according to Embodiment 1 of the present invention.

As shown in FIG. 1, a method for improving call quality for a user according to Embodiment 1 of the present invention includes:

Step 11: Obtain an interference suppression parameter and frequency band interference information of a target carrier.

In the embodiment of the present invention, the interference suppression parameter includes a roll-off factor of an RRC (Root Raised Cosine, root raised cosine) filter of a base station, and the frequency band interference information mainly refers to a signal interference situation of a high-frequency interference carrier and a low-frequency interference carrier of the target carrier.

The interference suppression parameter may be directly obtained from the base station. Of course, as the technology develops, it is also possible for a terminal to obtain the interference suppression parameter by itself. The roll-off factor of the RRC filter may be obtained by the base station or the terminal by means of simulation while considering factors such as interference distribution and types. For example, a roll-off factor of the RRC filter that achieves the best performance in a simulation result may be selected as the roll-off factor of the RRC filter in the embodiment of the present invention.

For the frequency band interference information, broadcast information sent by the base station may be received, and the frequency band interference information is obtained from the broadcast information, or the frequency band interference information may be obtained from the base station when the terminal accesses a network.

In the embodiment of the present invention, for the convenience of description, an adjacent carrier whose transmit frequency is lower than that of the target carrier is referred to as a low-frequency interference carrier, and an adjacent carrier whose transmit frequency is higher than that of the target carrier is referred to as a high-frequency interference carrier. In addition, in the embodiment of the present invention, interference of the low-frequency interference carrier and the high-frequency interference carrier on the target carrier includes two types, namely, GSM (Global System for Mobile Communications, Global System for Mobile Communications) signal interference and UMTS signal interference. Correspondingly, the frequency band interference information may include the following cases:

① The high-frequency interference carrier and the low-frequency interference carrier of the target carrier both have GSM signal interference.

② The high-frequency interference carrier and the low-frequency interference carrier of the target carrier both have UMTS signal interference.

③ The high-frequency interference carrier of the target carrier has the GSM signal interference, and the low-frequency interference carrier of the target carrier has the UMTS signal interference.

④ The high-frequency interference carrier of the target carrier has the UMTS signal interference, and the low-frequency interference carrier of the target carrier has the GSM signal interference.

⑤ The high-frequency interference carrier of the target carrier has the GSM signal interference, and the low-frequency interference carrier of the target carrier has no signal interference.

⑥ The high-frequency interference carrier of the target carrier has the UMTS signal interference, and the low-frequency interference carrier of the target carrier has no signal interference.

⑦ The high-frequency interference carrier of the target carrier has no signal interference, and the low-frequency interference carrier of the target carrier has the GSM signal interference.

⑧ The high-frequency interference carrier of the target carrier has no signal interference, and the low-frequency interference carrier of the target carrier has the UMTS signal interference.

The cases ① and ② may be referred to as symmetrical interference, and the cases ③ to ⑧ may be referred to as unsymmetrical interference.

Step 12: Determine an interference suppression coefficient according to the interference suppression parameter and the frequency band interference information.

Different manners are available for determining the interference suppression coefficient for the different cases of frequency band interference information listed in step 11.

For the cases ① and ②, methods for determining an interference suppression coefficient are the same, and the following formula (1) may be used to perform calculation:

$$h(t) = \frac{\sin\left(\pi\frac{t}{T}(1-\alpha)\right) + 4\alpha\frac{t}{T}\cdot\cos\left(\pi\frac{t}{T}(1+\alpha)\right)}{\pi\frac{t}{T}\sqrt{T}\left(1-\left(4\alpha\frac{t}{T}\right)^2\right)} \quad (1)$$

where, h(t) represents an interference suppression coefficient when the high-frequency interference carrier and the low-frequency interference carrier of the target carrier both have the GSM signal interference or represents an interference suppression coefficient when the high-frequency interference carrier and the low-frequency interference carrier of the target carrier both have the UMTS signal interference, t represents time, T represents a sampling period, and α represents a roll-off factor selected by the base station for the RRC filter.

For the cases ③ and ④, an interference suppression coefficient may be determined in the following manner, which includes:

121) Respectively obtain a first interference suppression coefficient and a second interference suppression coefficient of the target carrier.

The first interference suppression coefficient is an interference suppression coefficient when the high-frequency interference carrier and the low-frequency interference carrier of the target carrier both have the GSM signal interference, and the second interference suppression coefficient is an interference suppression coefficient when the high-frequency interference carrier and the low-frequency interference carrier of the target carrier both have the UMTS signal interference. The first interference suppression coefficient and the second interference suppression coefficient may be obtained by calculation with reference to the formula (1).

122) Perform a Fourier transform on the first interference suppression coefficient and the second interference suppression coefficient, to respectively obtain a first parameter and a second parameter.

The first interference suppression coefficient and the second interference suppression coefficient are transformed into a frequency domain by performing the Fourier transform; the first parameter is obtained by truncating a half of the first interference suppression coefficient after the Fourier transform, and the second parameter is obtained by truncating a half of the second interference suppression coefficient after the Fourier transform.

123) Concatenate the first parameter and the second parameter according to a signal interference situation of the high-frequency interference carrier and the low-frequency interference carrier of the target carrier to obtain a third parameter.

For the case ③, concatenation is performed by mapping the first parameter to the high-frequency interference carrier and the second parameter to the low-frequency interference carrier in this step, to obtain the third parameter. For the case ④, concatenation is performed by mapping the first parameter to the low-frequency interference carrier and the second parameter to the high-frequency interference carrier in this step, to obtain the third parameter.

For the cases ⑤ to ⑧, only one carrier of the high-frequency interference carrier and the low-frequency interference carrier may have signal interference; therefore, these cases are different from the cases ③ and ④ in that only a first parameter or a second parameter needs to be obtained according to a specific interference situation of the high-frequency interference carrier and the low-frequency interference carrier. The first interference suppression coefficient or second interference suppression coefficient may be obtained by calculation with reference to the formula (1). For example, when the high-frequency interference carrier or the low-frequency interference carrier has the GSM signal interference, the first parameter is obtained; when the high-frequency interference carrier or the low-frequency interference carrier has the UMTS signal interference, the second parameter is obtained.

Correspondingly, in the cases ⑤ to ⑧, a method for obtaining a third parameter is also different from that in the cases ③ and ④. Specifically, for the case ⑤, the first parameter is mapped to the high-frequency interference carrier to obtain the third parameter. For the case ⑥, the second parameter is mapped to the high-frequency interference carrier to obtain the third parameter. For the case ⑦, the first parameter is mapped to the low-frequency interference carrier to obtain the third parameter. For the case ⑧, the second parameter is mapped to the low-frequency interference carrier to obtain the third parameter.

124) Perform an inverse Fourier transform on the third parameter to transform it into a time domain, to obtain the interference suppression coefficient.

Figure 2A:
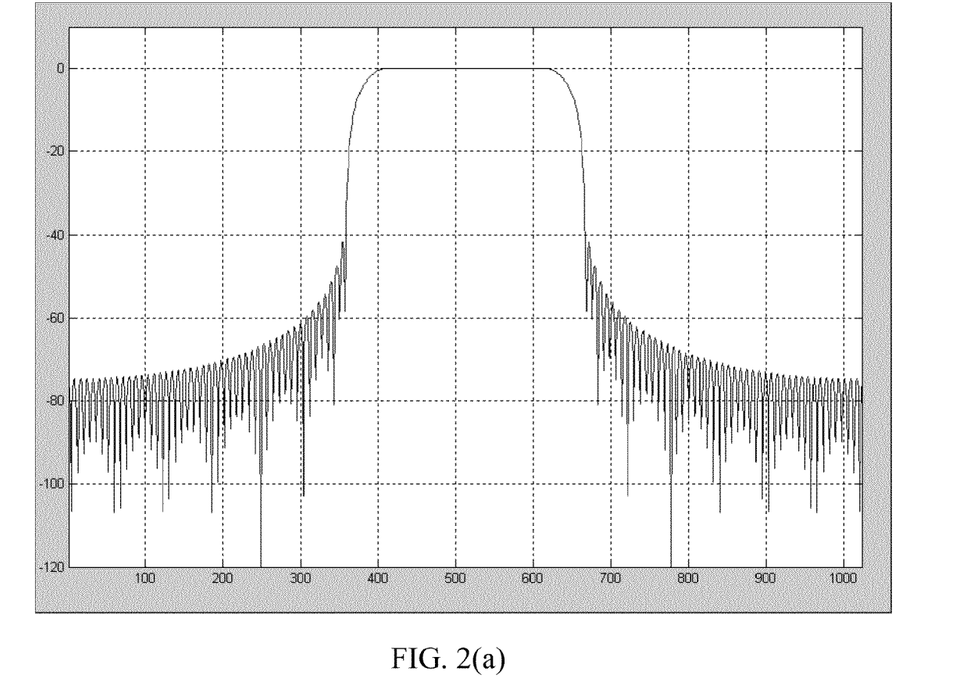
FIG. 2(a) to FIG. 2(f) are respectively schematic diagrams of a response curve of an RRC filter according to an embodiment of the present invention.
Figure 2B:
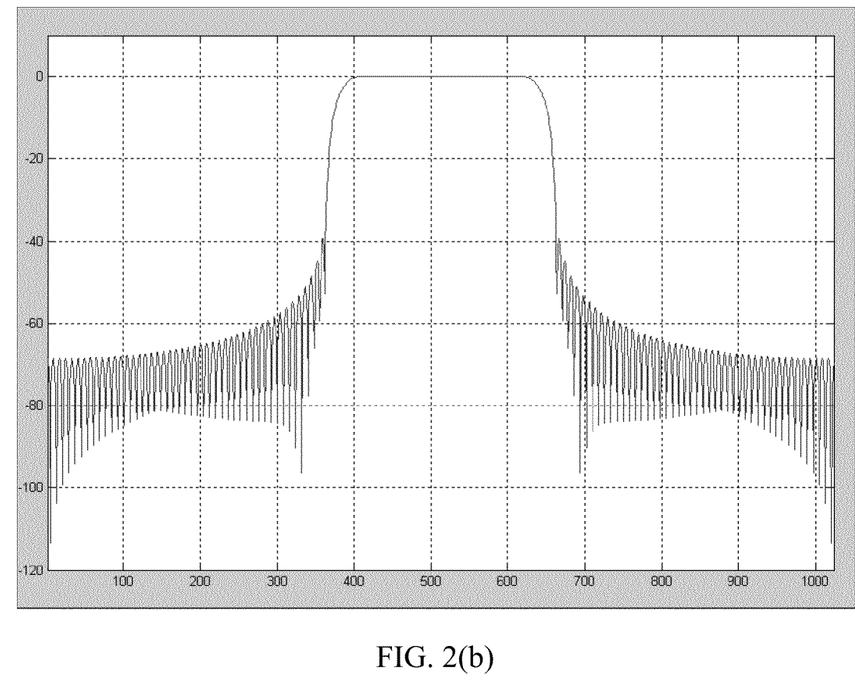
Figure 2C:
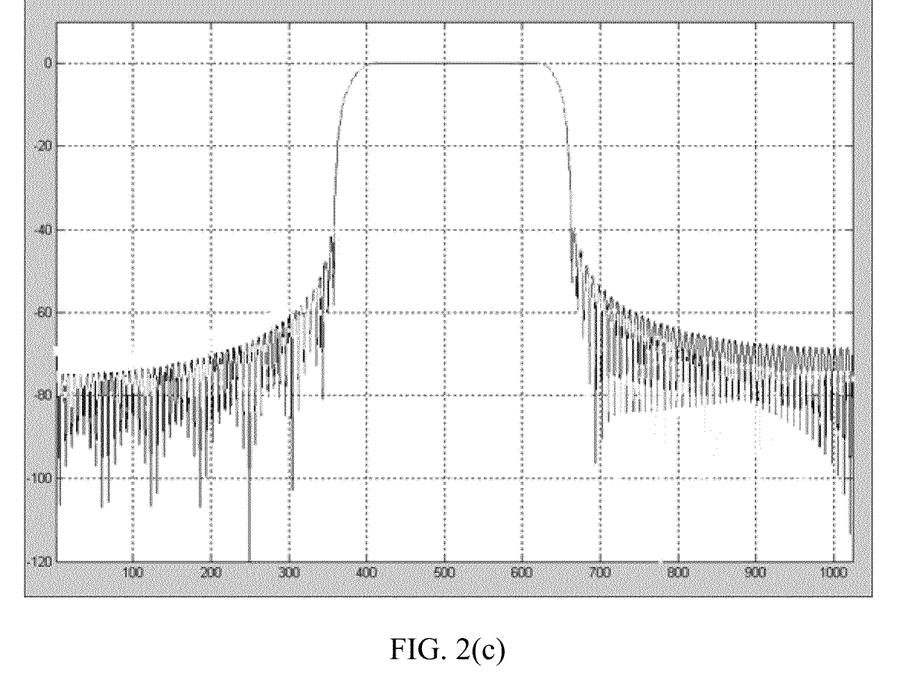

The following describes how to obtain the third parameter from the first parameter and the second parameter in the cases ③ and ④ in the embodiment of the present invention with reference to FIG. 2(a) to FIG. 2(c).

FIG. 2(a) is a diagram of a response curve of an RRC filter when the high-frequency interference carrier and the low-frequency interference carrier both have UMTS signal interference, and FIG. 2(b) is a diagram of a response curve of an RRC filter when the high-frequency interference carrier and the low-frequency interference carrier both have GSM signal interference. In FIG. 2(a) and FIG. 2(b), a curve in the middle that is approximate to a line is a frequency domain curve corresponding to the target carrier. Then, for the case ③, the high-frequency interference carrier of the target carrier has the GSM signal interference, and the low-frequency interference carrier of the target carrier has the UMTS signal interference. A left part of the curve corresponding to the target carrier in FIG. 2(a), a right part of the curve corresponding to the target carrier in FIG. 2(b), and the approximate line corresponding to the target carrier are truncated to constitute a curve waveform in FIG. 2(c). The curve waveform in FIG. 2(c) is the third parameter. Then, an inverse Fourier transform is performed on the third parameter to transform it into a time domain, to obtain the interference suppression coefficient. The principle of the processing of the case ④ is the same.

Figure 2D:
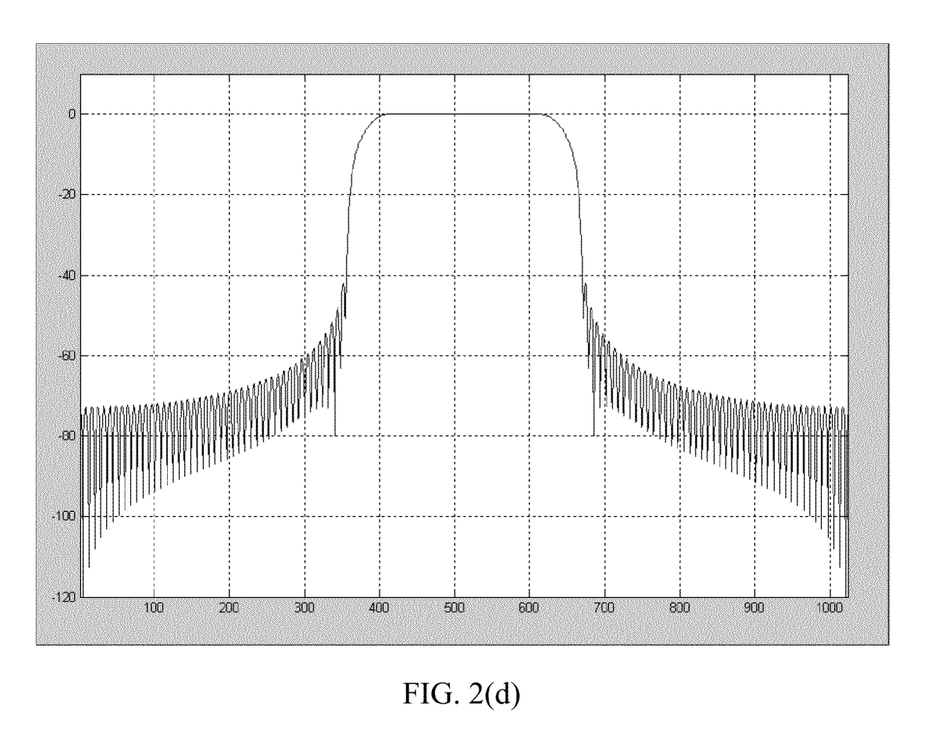
Figure 2E:
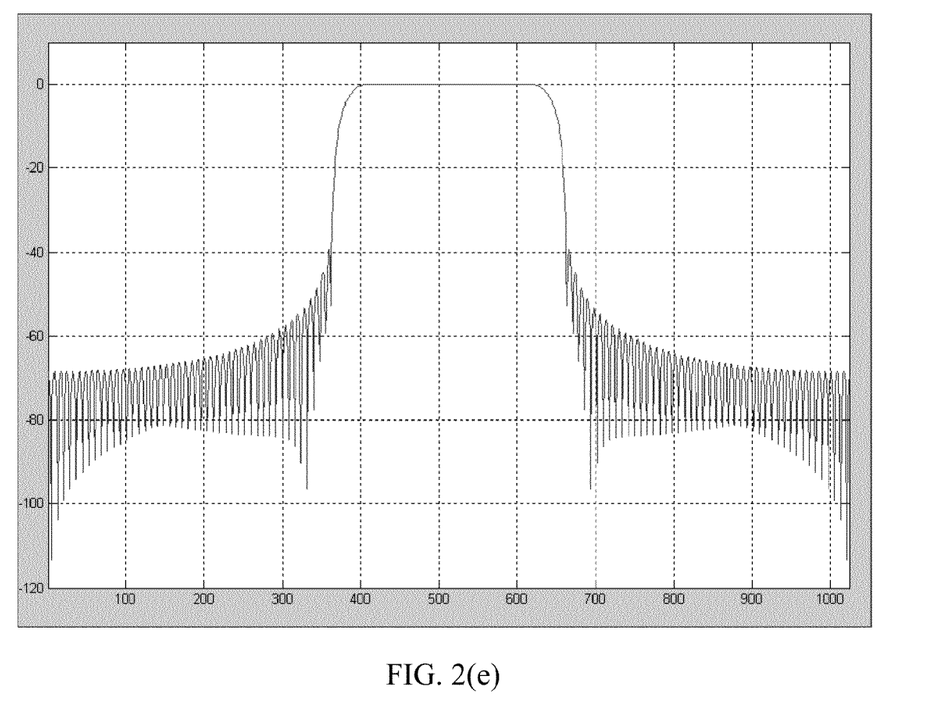
Figure 2F:
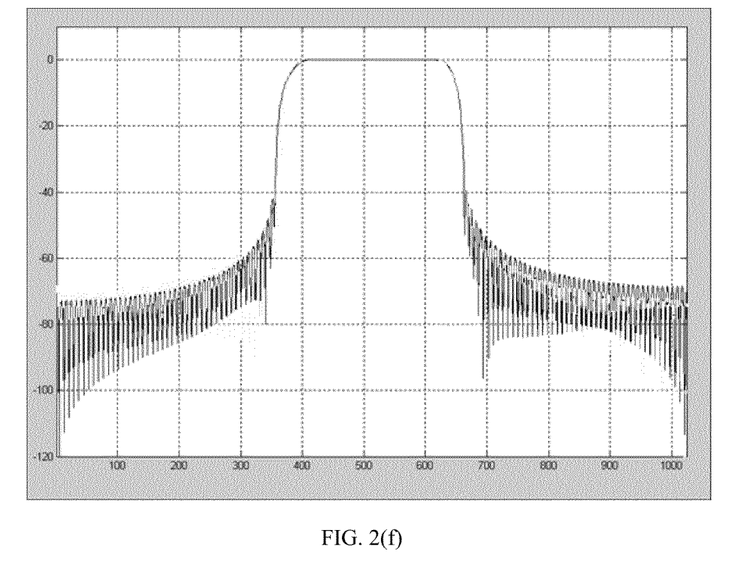

The following describes how to obtain the third parameter from the first parameter and the second parameter in the cases ⑤ to ⑧ in the embodiment of the present invention with reference to FIG. 2(d) to FIG. 2(f).

FIG. 2(d) is a diagram of a response curve of an RRC filter when neither the high-frequency interference carrier nor the low-frequency interference carrier has interference, and FIG. 2(e) is a diagram of a response curve of an RRC filter when the high-frequency interference carrier and the low-frequency interference carrier both have the GSM interference. Then, for the case ⑤, the high-frequency interference carrier of the target carrier has the GSM signal interference, and the low-frequency interference carrier of the target carrier has no signal interference. A right part of the curve corresponding to the target carrier in FIG. 2(d), a left part of the curve corresponding to the target carrier in FIG. 2(e), and an approximate line corresponding to the target carrier are truncated to constitute a curve waveform in FIG. 2(f). The curve waveform in FIG. 2(f) is the third parameter. Then, an inverse Fourier transform is performed on the third parameter to transform it into a time domain, to obtain the interference suppression coefficient. The principle of the processing of the cases ⑥ to ⑧ is the same.

Step 13: Suppress interference on the target carrier by using an interference suppression apparatus having the interference suppression coefficient.

In the embodiment, the interference suppression apparatus primarily refers to a filter. A filter whose filter coefficient is the interference suppression coefficient may be used to perform filtering processing on the high-frequency interference carrier and the low-frequency interference carrier, so as to suppress the interference of the high-frequency interference carrier and the low-frequency interference carrier on the target carrier.

If the bandwidths of carriers are non-standard, the spacing between the carriers decreases, and frequency spectrum utilization is improved. Under this precondition, the embodiment of the present invention may use the interference suppression coefficient obtained according to the interference suppression parameter and the frequency band interference information of the target carrier to suppress interference of other carriers, which solves the problem of increased interference between carriers under the circumstances where the bandwidths of carriers are non-standard. Therefore, compared with the prior art, the technical solution of the embodiment of the present invention can improve call quality for a user. Therefore, the method according to the embodiment of the present invention is capable of ensuring that call quality for a user is improved while improving frequency spectrum utilization.

Figure 3:
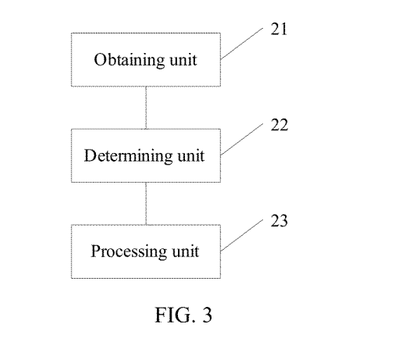
FIG. 3 is a schematic diagram of an apparatus for improving call quality for a user according to Embodiment 2 of the present invention.

As shown in FIG. 3, an apparatus for improving call quality for a user according to Embodiment 2 of the present invention includes: an obtaining unit 21, configured to obtain an interference suppression parameter and frequency band interference information of a target carrier; a determining unit 22, configured to determine an interference suppression coefficient according to the interference suppression parameter and the frequency band interference information; and a processing unit 23, configured to suppress interference on the target carrier by using the interference suppression coefficient.

Referring to the description above, the interference suppression parameter includes a roll-off factor of an RRC filter of a base station, and the frequency band interference information mainly refers to a signal interference situation of a high-frequency interference carrier and a low-frequency interference carrier of the target carrier.

Figure 4:
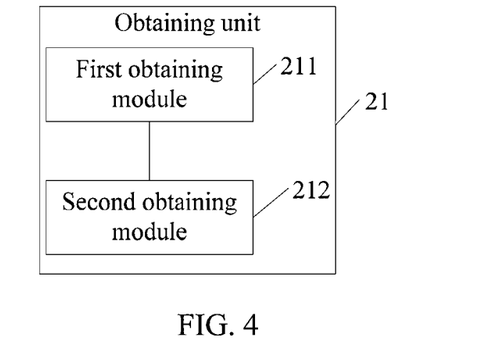
FIG. 4 is a schematic diagram of an obtaining unit according to Embodiment 2 of the present invention.

Correspondingly, as shown in FIG. 4, the obtaining unit 21 may include: a first obtaining module 211, configured to obtain the interference suppression parameter from the base station; and a second obtaining module 212, configured to receive broadcast information sent by the base station and obtain the frequency band interference information from the broadcast information, or obtain the frequency band interference information of the target carrier from the base station when accessing a network.

According to the description of the method embodiment, the frequency band interference information in the embodiment of the present invention may have different components. According to different content included in the frequency band interference information, the determining unit has different components.

For example, for the cases ① and ②, the determining unit 22 may specifically obtain the interference suppression coefficient by using the formula listed by the above formula (1).

Figure 5:
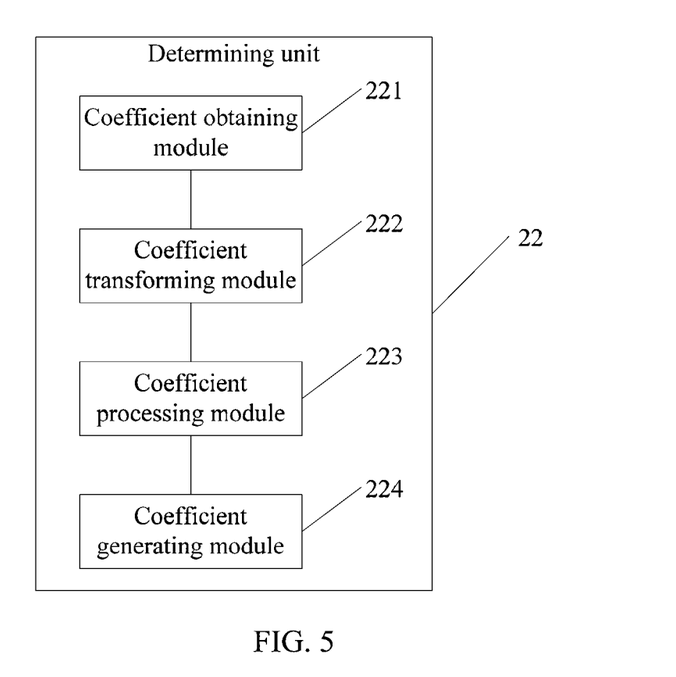
FIG. 5 is a schematic diagram of a determining unit according to Embodiment 2 of the present invention.

For the cases ③ to ⑧, as shown in FIG. 5, the determining unit 22 may include: a coefficient obtaining module 221, configured to respectively obtain a first interference suppression coefficient and/or a second interference suppression coefficient of the target carrier, where the first interference suppression coefficient is an interference suppression coefficient when the high-frequency interference carrier and the low-frequency interference carrier of the target carrier both have GSM signal interference, and the second interference suppression coefficient is an interference suppression coefficient when the high-frequency interference carrier and the low-frequency interference carrier of the target carrier both have UMTS signal interference; a coefficient transforming module 222, configured to perform a Fourier transform on the first interference suppression coefficient and/or the second interference suppression coefficient, to respectively obtain a first parameter and/or a second parameter, where the first parameter is obtained by truncating a half of the first interference suppression coefficient after the Fourier transform, and the second parameter is obtained by truncating a half of the second interference suppression coefficient after the Fourier transform; a coefficient processing module 223, configured to concatenate the first parameter and/or the second parameter according to a signal interference situation of the high-frequency interference carrier and the low-frequency interference carrier of the target carrier, to obtain a third parameter; and a coefficient generating module 224, configured to perform an inverse Fourier transform on the third parameter, to obtain the interference suppression coefficient.

Specifically, for the case ③ and the case ④, the coefficient obtaining module 221 needs to obtain the first interference suppression coefficient and the second interference suppression coefficient at the same time. Correspondingly, the coefficient transforming module 222 also needs to perform a Fourier transform on the first interference suppression coefficient and the second interference suppression coefficient; and the coefficient processing module 223 concatenates the first parameter and the second parameter according to a signal interference situation of the high-frequency interference carrier and the low-frequency interference carrier of the target carrier, to obtain a third parameter.

For example, for the cases ⑤ to ⑧, the coefficient obtaining module 221 needs to obtain the first interference suppression coefficient or the second interference suppression coefficient. Correspondingly, the coefficient transforming module 222 also needs to perform a Fourier transform on the first interference suppression coefficient or the second interference suppression coefficient; and the coefficient processing module 223 concatenates the first parameter or the second parameter according to a signal interference situation of the high-frequency interference carrier and the low-frequency interference carrier of the target carrier, to obtain a third parameter. Specifically, for the cases ⑤ and ⑦, the coefficient obtaining module 221 needs to obtain the first interference suppression coefficient. Correspondingly, the coefficient transforming module 222 performs a Fourier transform on the first interference suppression coefficient, and the coefficient processing module 223 concatenates the first parameter according to a signal interference situation of the high-frequency interference carrier and the low-frequency interference carrier of the target carrier, to obtain the third parameter. For the cases ⑥ and ⑧, the coefficient obtaining module 221 needs to obtain the second interference suppression coefficient. Correspondingly, the coefficient transforming module 222 performs a Fourier transform on the second interference suppression coefficient, and the coefficient processing module 223 concatenates the second parameter according to a signal interference situation of the high-frequency interference carrier and the low-frequency interference carrier of the target carrier, to obtain the third parameter.

For different cases, the coefficient processing module 223 has different operating principles.

For the case ③, the coefficient processing module 223 is specifically configured to perform concatenation by mapping the first parameter to the high-frequency interference carrier and the second parameter to the low-frequency interference carrier, to obtain the third parameter.

For the case ④, the coefficient processing module 223 is specifically configured to perform concatenation by mapping the first parameter to the low-frequency interference carrier and the second parameter to the high-frequency interference carrier, to obtain the third parameter.

For the case ⑤, the coefficient processing module 223 is specifically configured to map the first parameter to the high-frequency interference carrier to obtain the third parameter.

For the case ⑥, the coefficient processing module 223 is specifically configured to map the second parameter to the high-frequency interference carrier to obtain the third parameter.

For the case ⑦, the coefficient processing module 223 is specifically configured to map the first parameter to the low-frequency interference carrier to obtain the third parameter.

For the case ⑧, the coefficient processing module 223 is specifically configured to map the second parameter to the low-frequency interference carrier to obtain the third parameter.

According to the technical solution of the prior art, if the bandwidths of carriers are non-standard, the spacing between the carriers decreases, and frequency spectrum utilization is improved. Under this precondition, the embodiment of the present invention may use the interference suppression coefficient obtained according to the interference suppression parameter and the frequency band interference information of the target carrier to suppress interference of other carriers, which solves the problem of increased interference between carriers under the circumstances where the bandwidths of carriers are non-standard. Therefore, compared with the prior art, the technical solution of the embodiment of the present invention can improve call quality for a user. Therefore, the apparatus according to the embodiment of the present invention is capable of ensuring that call quality for a user is improved while improving frequency spectrum utilization.

In an actual application, the apparatus shown in FIG. 3 to FIG. 5 may be located in a filter. Reference may be made to the description of the method embodiment for the operating principle thereof.

Persons of ordinary skill in the art should understand that all or a part of the steps of the method according to the embodiments may be implemented by a computer program instructing relevant hardware. The program may be stored in a computer readable storage medium. When the program is run, the steps of the method according to the embodiments are performed. The storage medium may be a magnetic disk, an optical disk, a read-only memory (Read-Only Memory, ROM), or a random access memory (Random Access Memory, RAM).

The descriptions above are only specific implementation manners of the present invention, but are not intended to limit the protection scope of the present invention. Any variation or replacement that can be easily thought of by persons skilled in the art without departing from the technical scope disclosed by the present invention shall fall within the protection scope of the present invention. Therefore, the protection scope of the present invention shall be subject to the protection scope of the appended claims.

What is claimed is:

1. A method for improving call quality, comprising:
obtaining an interference suppression parameter and frequency band interference information of a target carrier;
determining an interference suppression coefficient according to the interference suppression parameter and the frequency band interference information; and
suppressing interference on the target carrier using an interference suppression apparatus having the interference suppression coefficient,
wherein the interference suppression parameter comprises a roll-off factor of a symmetrical root raised cosine RRC filter of a base station; and
wherein the frequency band interference information comprises one of the following cases:
a high-frequency interference carrier and a low-frequency interference carrier of the target carrier both have Global System for Mobile Communications (GSM) signal interference;
the high-frequency interference carrier and the low-frequency interference carrier of the target carrier both have Universal Mobile Telecommunications System (UMTS) signal interference;
the high-frequency interference carrier of the target carrier has the GSM signal interference and the low-frequency interference carrier of the target carrier has the UMTS signal interference;
the high-frequency interference carrier of the target carrier has the UMTS signal interference and the low-frequency interference carrier of the target carrier has the GSM signal interference;
the high-frequency interference carrier of the target carrier has the GSM signal interference or the UMTS signal interference and the low-frequency interference carrier of the target carrier has no signal interference; and
the high-frequency interference carrier of the target carrier has no signal interference and the low-frequency interference carrier of the target carrier has the GSM signal interference or the UMTS signal interference.

2. The method according to claim 1, wherein when the high-frequency interference carrier of the target carrier has the GSM signal interference and the low-frequency interference carrier of the target carrier has the UMTS signal interference, or when the high-frequency interference carrier of the target carrier has the UMTS signal interference and the low-frequency interference carrier of the target carrier has the GSM signal interference,
the determining an interference suppression coefficient according to the interference suppression parameter and the frequency band interference information comprises:
respectively obtaining a first interference suppression coefficient and a second interference suppression coefficient of the target carrier, wherein
the first interference suppression coefficient is an interference suppression coefficient when the high-frequency interference carrier and the low-frequency interference carrier of the target carrier both have the GSM signal interference, and
the second interference suppression coefficient is an interference suppression coefficient when the high-frequency interference carrier and the low-frequency interference carrier of the target carrier both have the UMTS signal interference.

3. The method according to claim 2, wherein when the high-frequency interference carrier of the target carrier has the GSM signal interference and the low-frequency interference carrier of the target carrier has the UMTS signal interference, or when the high-frequency interference carrier of the target carrier has the UMTS signal interference and the low-frequency interference carrier of the target carrier has the GSM signal interference, the determining an interference suppression coefficient according to the interference suppression parameter and the frequency band interference information further comprises:
obtaining the first interference suppression coefficient and the second interference suppression coefficient of the target carrier;
performing a Fourier transform on the first interference suppression coefficient and the second interference suppression coefficient, to respectively obtain a first parameter and a second parameter, wherein the first parameter is obtained by truncating a half of the first interference suppression coefficient after the Fourier transform, and the second parameter is obtained by truncating a half of the second interference suppression coefficient after the Fourier transform;
concatenating the first parameter and the second parameter according to a signal interference situation of the high-frequency interference carrier and the low-frequency interference carrier of the target carrier to obtain a third parameter; and
performing an inverse Fourier transform on the third parameter to obtain the interference suppression coefficient.

4. The method according to claim 3, wherein: when the high-frequency interference carrier of the target carrier has the GSM signal interference and the low-frequency interference carrier of the target carrier has the UMTS signal interference, the concatenating the first parameter and the second parameter comprises:
performing concatenation by mapping the first parameter to the high-frequency interference carrier and the second parameter to the low-frequency interference carrier, to obtain the third parameter.

5. The method according to claim 3, wherein when the high-frequency interference carrier of the target carrier has the UMTS signal interference and the low-frequency interference carrier of the target carrier has the GSM signal interference, the concatenating the first parameter and the second parameter comprises:
performing concatenation by mapping the first parameter to the low-frequency interference carrier and the second parameter to the high-frequency interference carrier, to obtain the third parameter.

6. The method according to claim 2, wherein when the high-frequency interference carrier of the target carrier has the GSM signal interference and the low-frequency interference carrier of the target carrier has no signal interference, the determining an interference suppression coefficient according to the interference suppression parameter and the frequency band interference information comprises:
obtaining the first interference suppression coefficient;
performing a Fourier transform on the first interference suppression coefficient, to obtain a first parameter, wherein the first parameter is obtained by truncating a half of the first interference suppression coefficient after the Fourier transform;
concatenating the first parameter according to a signal interference situation of the high-frequency interference carrier of the target carrier to obtain a third parameter; and performing an inverse Fourier transform on the third parameter to obtain the interference suppression coefficient.

7. The method according to claim 6, wherein the concatenating the first parameter comprises:
mapping the first parameter to the high-frequency interference carrier to obtain the third parameter.

8. The method according to claim 2, wherein when the high-frequency interference carrier of the target carrier has the UMTS signal interference and the low-frequency interference carrier of the target carrier has no signal interference, the determining an interference suppression coefficient according to the interference suppression parameter and the frequency band interference information comprises:
obtaining the second interference suppression coefficient of the target carrier;
performing a Fourier transform on the second interference suppression coefficient, to obtain a second parameter, wherein the second parameter is obtained by truncating a half of the second interference suppression coefficient after the Fourier transform;
concatenating the second parameter according to a signal interference situation of the high-frequency interference carrier; and
performing an inverse Fourier transform on the third parameter to obtain the interference suppression coefficient.

9. The method according to claim 8, wherein the concatenating the second parameter comprises:
mapping the second parameter to the high-frequency interference carrier to obtain the third parameter.

10. The method according to claim 2, wherein when the high-frequency interference carrier of the target carrier has no signal interference and the low-frequency interference carrier of the target carrier has the GSM signal interference, the determining an interference suppression coefficient according to the interference suppression parameter and the frequency band interference information comprises:
obtaining the first interference suppression coefficient;
performing a Fourier transform on the first interference suppression coefficient, to obtain a first parameter, wherein the first parameter is obtained by truncating a half of the first interference suppression coefficient after the Fourier transform;
concatenating the first parameter according to a signal interference situation of the low-frequency interference carrier of the target carrier to obtain a third parameter; and
performing an inverse Fourier transform on the third parameter to obtain the interference suppression coefficient.

11. The method according to claim 10, wherein the concatenating the first parameter comprises:
mapping the first parameter to the low-frequency interference carrier to obtain the third parameter.

12. The method according to claim 2, wherein when the high-frequency interference carrier of the target carrier has no signal interference and the low-frequency interference carrier of the target carrier has the UMTS signal interference, the determining an interference suppression coefficient according to the interference suppression parameter and the frequency band interference information comprises:
obtaining the second interference suppression coefficient;
performing a Fourier transform on the second interference suppression coefficient, to obtain a second parameter, wherein the second parameter is obtained by truncating a half of the second interference suppression coefficient after the Fourier transform;
concatenating the second parameter according to a signal interference situation of the low-frequency interference carrier of the target carrier to obtain a third parameter; and
performing an inverse Fourier transform on the third parameter to obtain the interference suppression coefficient.

13. The method according to claim 12, wherein the concatenating the second parameter comprises:
mapping the second parameter to the s-frequency interference carrier to obtain the third parameter.

14. The method according to claim 2, wherein the first interference suppression coefficient or the second interference suppression coefficient is determined by a sampling period and a roll-off factor selected by the base station for the RRC filter.

15. The method according to claim 1, wherein when the high-frequency interference carrier and the low-frequency interference carrier of the target carrier both have the GSM signal interference or the high-frequency interference carrier and the low-frequency interference carrier of the target carrier both have the UMTS signal interference, the determining an interference suppression coefficient according to the interference suppression parameter and the frequency band interference information comprises: determining the first interference suppression coefficient or the second interference suppression coefficient according to a sampling period and a roll-off factor selected by the base station for the RRC filter.

16. An apparatus for improving call quality, comprising;
an obtaining unit, configured to obtain an interference suppression parameter and frequency band interference information of a target carrier;
a determining unit, configured to determine an interference suppression coefficient according to the interference suppression parameter and the frequency band interference information; and
a processing unit, configured to suppress interference on the target carrier using the interference suppression coefficient,
wherein the interference suppression parameter comprises a roll-off factor of a symmetrical root raised cosine (RRC) filter of the base station;
when a high-frequency interference carrier of the target carrier has Global System for Mobile Communications (GSM) signal interference and a low-frequency interference carrier of the target carrier has Universal Mobile Telecommunications System (UMTS) signal interference, or
when the high-frequency interference carrier of the target carrier has UMTS signal interference and the low-frequency interference carrier of the target carrier has GSM signal interference,
the determining unit comprises: a first coefficient obtaining module, configured to respectively obtain a first interference suppression coefficient and a second interference suppression coefficient of the target carrier, wherein the first interference suppression coefficient is an interference suppression coefficient when the high-frequency interference carrier and the low-frequency interference carrier of the target carrier both have the GSM signal interference, and
the second interference suppression coefficient is an interference suppression coefficient when the high-frequency interference carrier and the low-frequency interference carrier of the target carrier both have the UMTS signal interference.

17. The apparatus according to claim 16, wherein when the high-frequency interference carrier of the target carrier has the GSM signal interference and the low-frequency interference carrier of the target carrier has the UMTS signal interference, or when the high-frequency interference carrier of the target carrier has the UMTS signal interference and the low-frequency interference carrier of the target carrier has the GSM signal interference, the determining unit further comprises:
a first coefficient transforming module, configured to perform a Fourier transform on the first interference suppression coefficient and the second interference suppression coefficient, to respectively obtain a first parameter and a second parameter,
wherein the first parameter is obtained by truncating a half of the first interference suppression coefficient after the Fourier transform, and
the second parameter is obtained by truncating a half of the second interference suppression coefficient after the Fourier transform;
a first coefficient processing module, configured to concatenate the first parameter and the second parameter according to a signal interference situation of the high-frequency interference carrier and the low-frequency interference carrier of the target carrier to obtain a third parameter; and
a first coefficient generating module, configured to perform an inverse Fourier transform on the third parameter, to obtain the interference suppression coefficient.

18. The apparatus according to claim 17, wherein when the high-frequency interference carrier of the target carrier has the UMTS signal interference and the low-frequency interference carrier of the target carrier has the GSM signal interference, the first coefficient processing module is configured to perform concatenation by mapping the first parameter to the low-frequency interference carrier and the second parameter to the high-frequency interference carrier, to obtain the third parameter.

19. The apparatus according to claim 17, wherein: when the high-frequency interference carrier of the target carrier has the GSM signal interference and the low-frequency interference carrier of the target carrier has the UMTS signal interference, the first coefficient processing module is configured to perform concatenation by mapping the first parameter to the high-frequency interference carrier and the second parameter to the low-frequency interference carrier, to obtain the third parameter.

20. The apparatus according to claim 16, wherein when the high-frequency interference carrier of the target carrier has GSM signal interference and the low-frequency interference carrier of the target carrier has no signal interference, the determining unit comprises:
a second coefficient obtaining module, configured to obtain the first interference suppression coefficient of the target carrier,
a second coefficient transforming module, configured to perform a Fourier transform on the first interference suppression coefficient, to obtain a first parameter,
wherein the first parameter is obtained by truncating a half of the first interference suppression coefficient after the Fourier transform,
a second coefficient processing module, configured to concatenate the first parameter according to a signal interference situation of the high-frequency interference carrier of the target carrier to obtain a third parameter; and
a second coefficient generating module, configured to perform an inverse Fourier transform on the third parameter, to obtain the interference suppression coefficient.

21. The apparatus according to claim 20, wherein the second coefficient processing module is configured to map the first parameter to the high-frequency interference carrier to obtain the third parameter.

22. The apparatus according to claim 16, wherein when the high-frequency interference carrier of the target carrier has UMTS signal interference and the low-frequency interference carrier of the target carrier has no signal interference, the determining unit comprises:
a third coefficient obtaining module, configured to obtain the second interference suppression coefficient of the target carrier,
a third coefficient transforming module, configured to perform a Fourier transform on the second interference suppression coefficient, to obtain a second parameter,
wherein the second parameter is obtained by truncating a half of the second interference suppression coefficient after the Fourier transform,
a third coefficient processing module, configured to concatenate the second parameter according to a signal interference situation of the high-frequency interference carrier of the target carrier to obtain a third parameter; and
a third coefficient generating module, configured to perform an inverse Fourier transform on the third parameter, to obtain the interference suppression coefficient.

23. The apparatus according to claim 22, wherein the third coefficient processing module is configured to map the second parameter to the high-frequency interference carrier to obtain the third parameter.

24. The apparatus according to claim 16, wherein when the high-frequency interference carrier of the target carrier has no signal interference and the low-frequency interference carrier of the target carrier has GSM signal interference, the determining unit comprises:
a fourth coefficient obtaining module, configured to obtain the first interference suppression coefficient of the target carrier,
a fourth coefficient transforming module, configured to perform a Fourier transform on the first interference suppression coefficient, to obtain a first parameter,
wherein the first parameter is obtained by truncating a half of the first interference suppression coefficient after the Fourier transform,
a fourth coefficient processing module, configured to concatenate the first parameter according to a signal interference situation of the low-frequency interference carrier of the target carrier to obtain a third parameter; and
a fourth coefficient generating module, configured to perform an inverse Fourier transform on the third parameter, to obtain the interference suppression coefficient.

25. The apparatus according to claim 24, wherein the fourth coefficient processing module is configured to map the first parameter to the low-frequency interference carrier to obtain the third parameter.

26. The apparatus according to claim 16, wherein when the high-frequency interference carrier of the target carrier has no signal interference and the low-frequency interference carrier of the target carrier has UMTS signal interference, the determining unit comprises:
a fifth coefficient obtaining module, configured to obtain the second interference suppression coefficient of the target carrier, a fifth coefficient transforming module, configured to perform a Fourier transform on the second interference suppression coefficient, to obtain a second parameter, wherein the second parameter is obtained by truncating a half of the second interference suppression coefficient after the Fourier transform, a fifth coefficient processing module, configured to concatenate the second parameter according to a signal interference situation of the low-frequency interference carrier of the target carrier to obtain a third parameter; and a fifth coefficient generating module, configured to perform an inverse Fourier transform on the third parameter, to obtain the interference suppression coefficient.

27. The apparatus according to claim 26, wherein the fifth coefficient processing module is configured to map the second parameter to the low-frequency interference carrier to obtain the third parameter.

28. The apparatus according to claim 16, wherein the first coefficient obtaining module obtains the first interference suppression coefficient or the second interference suppression coefficient according to a sampling period and a roll-off factor selected by the base station for the RRC filter.

29. The apparatus according to claim 16, wherein when the high-frequency interference carrier and the low-frequency interference carrier of the target carrier both have the GSM signal interference or the high-frequency interference carrier and the low-frequency interference carrier of the target carrier both have the UMTS signal interference, the determining unit is configured to determine the first interference suppression coefficient or the second interference suppression coefficient according to a sampling period and a roll-off factor selected by the base station for the RRC filter.

* * * * *